(12) United States Patent
Soufiani et al.

(10) Patent No.: US 11,945,956 B2
(45) Date of Patent: Apr. 2, 2024

(54) SURFACE MODIFIED CARBON BLACK TO SIMULTANEOUSLY IMPROVE ROLLING RESISTANCE, WET TRACTION, AND WEAR RESISTANCE

(71) Applicant: Continental Carbon Co., Houston, TX (US)

(72) Inventors: Raymond Soufiani, Katy, TX (US); Eduardo Vega, Jr., Katy, TX (US); Lashan Madusha Hendavitharanage De Silva, Dickinson, TX (US); Frank E. Welsh, Sugar Land, TX (US); Luis P. Chibante, Fredericton (CA)

(73) Assignee: Continental Carbon Co., Houston, TX (US)

( * ) Notice: Subject to any disclaimer, the term of this patent is extended or adjusted under 35 U.S.C. 154(b) by 0 days.

(21) Appl. No.: 18/197,835

(22) Filed: May 16, 2023

(65) Prior Publication Data

US 2023/0303847 A1    Sep. 28, 2023

Related U.S. Application Data

(62) Division of application No. 17/581,544, filed on Jan. 21, 2022, now Pat. No. 11,753,549.

(60) Provisional application No. 63/143,563, filed on Jan. 29, 2021.

(51) Int. Cl.
*C08L 9/06* (2006.01)
*C09C 1/56* (2006.01)

(52) U.S. Cl.
CPC ............. *C09C 1/565* (2013.01); *C08L 9/06* (2013.01); *C09C 1/56* (2013.01); *C01P 2002/88* (2013.01); *C01P 2004/02* (2013.01); *C01P 2004/50* (2013.01); *C01P 2004/61* (2013.01); *C01P 2004/62* (2013.01); *C01P 2004/64* (2013.01); *C01P 2006/12* (2013.01); *C01P 2006/42* (2013.01); *C08L 2205/025* (2013.01); *C08L 2312/00* (2013.01)

(58) Field of Classification Search
CPC ................................ C09C 1/56; C08L 9/06
USPC ............................................... 523/206
See application file for complete search history.

(56) References Cited

U.S. PATENT DOCUMENTS

2014/0290532 A1 * 10/2014 Rodriguez ............... C09C 1/48
106/473

FOREIGN PATENT DOCUMENTS

WO    WO-2017074050 A1 *  5/2017 ............... C09C 1/56

* cited by examiner

*Primary Examiner* — Deve V Hall
(74) *Attorney, Agent, or Firm* — Conley Rose, P.C.

(57) ABSTRACT

Non-ASTM low hysteresis carbon blacks chemically treated, and surface coated with a compound comprising at least one amine group and at least one thiol group, and/or di- and/or polysulfidic linkage. When compared with a standard ASTM grade compound, the disclosed surface modified low hysteresis carbon black compound shows improved rolling resistance, wet traction, and DIN abrasion, comparable to silica compounds.

21 Claims, 4 Drawing Sheets

(a)

(b)

(c)

SURFACE MODIFIED CARBON BLACK TO SIMULTANEOUSLY IMPROVE ROLLING RESISTANCE, WET TRACTION, AND WEAR RESISTANCE

CROSS-REFERENCE TO RELATED APPLICATIONS

This application is a divisional of U.S. application Ser. No. 17/581,544 filed Jan. 21, 2022, and entitled "Surface Modified Carbon Black to Simultaneously Improve Rolling Resistance, Wet Traction, and Wear Resistance," which claims the benefit of U.S. provisional patent application Ser. No. 63/143,563, filed Jan. 29, 2021 and entitled "Surface Modified Carbon Black to Improve Rolling Resistance, Wet Traction, and Wear Resistance Simultaneously," the disclosure of each of which is hereby incorporated herein by reference in its entirety for purposes not contrary to this disclosure.

STATEMENT REGARDING FEDERALLY SPONSORED RESEARCH OR DEVELOPMENT

Not applicable.

BACKGROUND

This disclosure relates to a surface modified carbon black compound. The disclosure also relates to a compound of low hysteresis surface treated carbon black in solution styrene-butadiene rubber (SSBR)/polybutadiene rubber (BR) blend with simultaneously improved rolling resistance, wet traction, and wear resistance.

BACKGROUND OF DISCLOSURE

Rolling resistance, wet traction, and wear resistance are three major properties of importance for tire manufacturers, and form the "magic triangle" of these properties. With ASTM standard carbon blacks, it has conventionally been impossible to improve all three properties at the same time, and tire manufacturers thus typically utilize silica as a filler in their tread compound to significantly improve rolling resistance and wet traction with some improvement or no negative effect on wear resistance. Rubber tread compound comprises polymer, filler, curatives, and other ingredients; typical rubber compound ingredients are listed in Table 3 hereinbelow.

Compounding with silica is, however, costly due to the abrasive nature of silica, which results in the need for costly machinery maintenance and the use of expensive coupling agents to act as a bridge between silica and polymer. Compared to carbon black, silica is more difficult to process, has no advantage in dry traction, is nonconductive, and it is thus ultimately necessary to combine silica with carbon black. Additionally, although the use of silica can improve rolling resistance and wet traction in certain rubber compounds, these advantages are not present in all rubber compounds, notably natural rubber used in truck tires.

The prior art discloses different strategies that have been attempted in order to develop new specialty carbon blacks and/or modify ASTM grade carbon blacks in order to produce compounds with similar properties to those provided by silica compounds. These prior art strategies have mainly focused on increasing filler-polymer interactions and minimizing filler-filler interactions by modifying carbon black, polymer and mixing procedures.

To achieve these goals, the prior art approaches have used low hysteresis carbon black, surface treated carbon black, carbon black-silica dual phase fillers (see, for example, Eco black by Cabot Corp.), and carbon black with modified surface microstructure (see, for example, ECORAX® by Orion) in tread compounds. None of these strategies has, however, simultaneously improved rolling resistance, wet traction, and wear resistance (the magic triangle parameters noted above) as silica alone does.

For example, low hysteresis carbon black has been shown to improve solely the rolling resistance. Compared to corresponding ASTM grade carbon black, low hysteresis carbon black has a wider aggregate size distribution, with a higher percentage of larger aggregates. When the carbon black aggregate size distribution is narrow, it has a greater tendency to form stronger filler-filler networking in the rubber compound. Therefore, using carbon black with widened aggregate size distribution generally decreases the filler-filler networking strength, while maintaining the same average strength of polymer-filler interactions. However, low hysteresis carbon black is not adequate for increasing polymer-filler interactions to result in improvement of rubber properties other than rolling resistance.

Other prior art has focused on studies on surface treatment of carbon black; most such studies have focused on increasing polymer-filler interactions. Some have shown improvement of rolling resistance but not with simultaneous improvement in the other properties of the magic triangle (i.e., wet traction and wear resistance). Although polymer-filler interaction was increased, filler-filler networking strength was still predominant. Accordingly, the three rubber properties of the magic triangle were not shown to improve concurrently.

U.S. Pat. No. 2013/0046064 A1 discloses a process for the use of surface treated carbon black with a functionalized polymer that displayed an improved rolling resistance, wet traction, and wear resistance comparable to silica. However, utilization of functionalized polymer in the tire industry is cost prohibitive and, thus, impractical.

A need thus exists for compounds and methods for practically and simultaneously improving rolling resistance, wet traction, and wear resistance.

BRIEF SUMMARY OF DISCLOSURE

Disclosed herein are embodiments of a compound of low hysteresis surface treated carbon black in solution SBR/BR blend (e.g., SSBR/BR), which simultaneously improve rolling resistance, wet traction and wear resistance, and, thus, address the shortfalls of conventional compounds and methods.

Herein disclosed is a surface modified low hysteresis carbon black (SMLHCB) compound to simultaneously improve rolling resistance, wet traction, and wear resistance, the SMLHCB compound comprising: a low hysteresis carbon black having a surface that has been modified to have a surface modifier attached thereto, wherein the surface modifier comprises at least one amine group and at least one thiol group and/or di- and/or polysulfidic linkage.

Also disclosed herein is a rubber compound comprising the SMLHCB compound of this disclosure and a natural or synthetic polymer or polymer blend. The natural or synthetic polymer or polymer blend can comprise a solution styrene butadiene rubber (SBR) (SSBR)-polybutadiene rubber (BR) blend.

Further provided herein is a method of producing a surface modified low hysteresis carbon black (SMLHCB), the method comprising: treating a surface of a low hysteresis carbon black with from about 0.1 to about 50 wt % of a surface modifier, wherein the surface modifier comprises at least one amine group, to form the SMLHCB.

Additionally, herein disclosed is a method for enhanced crosslinking of a surface modified low hysteresis carbon black (SMLHCB) into a polymer to create a rubber compound, the method comprising: mixing the SMLHCB with the polymer at a temperature and a pressure to provide the SMLHCB, wherein the SMLHCB is a SMLHCB as described herein.

BRIEF DESCRIPTION OF THE DRAWINGS

For a detailed description of various exemplary embodiments, reference will now be made to the accompanying drawings in which.

DETAILED DESCRIPTION

Figure 1:
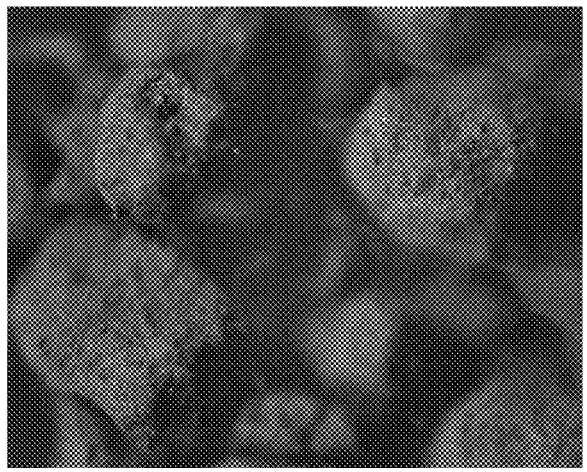
FIG. 1 depicts embodiments of 5× optical images of embodiments of carbon blacks according to this disclosure; (a) depicts N234, (b) depicts ST4-N234, and (c) depicts ST8-N234.
Figure 1:
Figure 1:
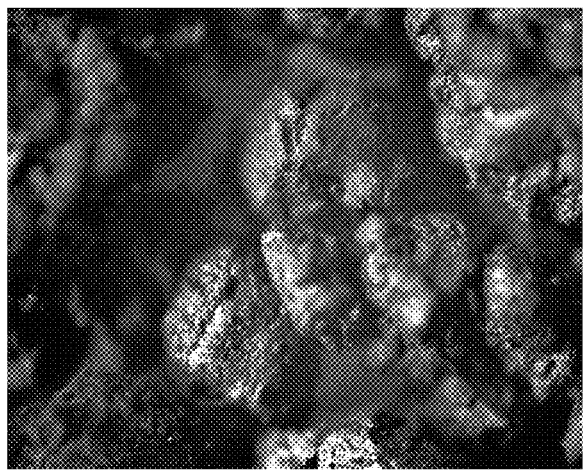

The following discussion is directed to various exemplary embodiments of this disclosure. However, the embodiments disclosed herein should not be interpreted, or otherwise utilized, as limiting the scope of the disclosure, including the claims. In addition, one skilled in the art will understand that the following description has broad application, and the discussion of any embodiment is meant only to be exemplary of that embodiment, and that the scope of this disclosure, including the claims, is not limited to that embodiment.

The drawing figures are not necessarily to scale. Certain features and components herein may be shown exaggerated in scale or in somewhat schematic form and some details of conventional elements may be omitted in interest of clarity and conciseness.

In the following discussion and in the claims, the terms "including" and "comprising" are used in an open-ended fashion, and thus should be interpreted to mean "including, but not limited to . . . ." As used herein, the term "about," when used in conjunction with a percentage or other numerical amount, means plus or minus 10% of that percentage or other numerical amount. For example, the term "about 80%," would encompass 80% plus or minus 8%. References cited herein are incorporated in their entirety by such reference for purposes not contrary to this disclosure.

In embodiments the rubber compound formulation from U.S. Pat. No. 5,227,425 can be utilized as the silica compound formulation herein noted as a standard for comparison.

SMLHCB

Disclosed herein are embodiments of a compound of a surface modified low hysteresis carbon black (SMLHCB) (e.g., ST4-N234 (Compound C), ST4-LH11 (Compound D), described in the Examples hereinbelow) in solution SBR (SSBR)-Polybutadiene (BR) blend (e.g., a 75/25 ratio of SSBR/BR). Utilization of the SMLHCB can, in embodiments, simultaneously improve rolling resistance, wet traction, and wear resistance, comparable to the properties obtained with silica as filler. Filler-filler networking strength is advantageously decreased using low hysteresis carbon black and, at the same time, polymer-filler interactions are increased using surface treated carbon black. These effects improve the rubber tread compound properties of interest simultaneously and thus address the above noted shortfalls of conventional methods.

In embodiments, a surface modified low hysteresis carbon black (SMLHCB) compound of this disclosure can simultaneously improve rolling resistance, wet traction, and wear resistance. The SMLHCB compound can comprise: a low hysteresis carbon black having a surface that has been modified to have a surface modifier attached thereto. The surface modifier can comprise at least one amine group and at least one thiol group and/or di- or polysulfidic linkage. Also provided herein is a rubber compound comprising the SMLHCB compound of this disclosure and a natural or synthetic polymer or polymer blend.

In embodiments, a rubber compound of this disclosure comprises a solution SBR (SSBR)-Polybutadiene (BR) blend. For example, the rubber compound can have a weight ratio of SSBR:BR in a range of from about 100:0, 99.9:0.1; 75:25, 0.1:99.9, or 0:100, or in a range of from about 100:0 to about 0:100, from about 99.9:0.1 to about 0.1:99.9, from about 90:10 to about 10:90, or from about 80:20 to about 20:80.

In embodiments, the surface modifier of the SMLHCB compound of this disclosure comprises an amino acid. For example, in embodiments, the amino acid can comprise a naturally occurring amino acid; a modified natural amino acid; a synthetic amino acid; a dimer thereof; a polymer thereof; a salt thereof; or a combination thereof. By way of further example, in embodiments, the amino acid comprises cysteine, cystine, homocysteine, homocystine, methionine, or a combination thereof.

In embodiments, the surface modifier comprises an amino acid having at least one thiol group and/or or di- or polysulfidic linkage, and/or an organic or inorganic compound containing at least one amine group, and at least one thiol group and/or di- or polysulfidic linkage. The surface modifier can, in embodiments, be chemically linked to the surface of the carbon black (e.g., the surface of the low hysteresis carbon black) via single or multiple bonds. In embodiments, the surface modifier can be chemically linked to the surface by an amide or other bond formation, chemisorption, physisorption, or a combination thereof. In embodiments, the surface modifier can be linked to the surface by at least one of: van der Waals interactions with a porous three-dimensional graphite lattice of the low hysteresis carbon black, covalent and/or ionic or other non-valent interactions with active surface moieties of the surface. Said active surface moieties can comprise oxygen, nitrogen, and/or sulfur on the surface.

In embodiments, the surface modifier comprises from about 0.1 to about 50 wt %, from about 0.1 to about 30 wt %, from about 1.0 to about 16 wt %, or from about 3 to about 20 wt % of the surface modified carbon black (e.g., of the surface modified low hysteresis carbon black (SMLHCB)).

As noted above, the chemical surface treatment and/or modification of the carbon black can be effected via utilization of any naturally occurring amino acid; a modified natural amino acid, or a synthetic amino acid or salt form thereof; a dimer; or polymer, or a salt form of any dimer or polymer formed by any amino acid compound disclosed herein. In embodiments, as noted above, the amino acid comprises at least one thiol group, and/or di- and/or polysulfidic linkage, or any organic or inorganic compound containing at least one amine group and at least one thiol group, and/or di- and/or polysulfidic linkage. In embodiments the amino acid(s) utilized as surface treatment compounds include cysteine, cystine, homocysteine, homocysteine, and/or methionine.

In embodiments, chemical compounds containing amine groups can bind to the carbon black surface by reacting with strong acidic groups present on the surface (See for example: Chemical Bonding of Tetraethylenepentamine to Nitric Acid-Oxidized Carbon Fibers: An XPS/ISS Investigation, Steven D. Gardner, Chakravarthy S. K. Singamsetty, Guoren He, and Charles U. Pittman, 51(5), 636, 1997).

In embodiments, the chemical compound utilized in the surface treatment of the carbon black can be chemisorbed onto the carbon black surface via amide bond formation by virtue of the reaction of an amine group of the chemical compound used in the surface treatment and strong acidic groups on the carbon black surface. In embodiments the surface treatment chemical compound is an amino acid as disclosed herein, wherein the amino acid comprises at least one thiol group, and/or di- and/or polysulfidic linkage.

In embodiments, a surface treatment chemical compound may comprise more than one amine group, and thus can form multiple (e.g., a plurality of) bonds with the carbon black surface. In addition to the amide bond formation, the surface treatment chemical compound may adhere to the carbon black surface by chemisorption or physisorption through at least one of: van der Waals interactions with porous three-dimensional graphite lattice of carbon black, covalent and/or ionic or other non-valent interactions with active species such as oxygen, nitrogen, etc. found on the carbon black surface.

In a further embodiment, the thiol group(s) present in the surface treatment chemical compound may form a chemical bond with polymers containing unsaturated bonds. The polysulfidic linkage in the surface treatment chemical compound can fracture during vulcanization and form a chemical bond with unsaturated polymer. In embodiments, the surface treatment chemical compound can further react with elemental sulfur to form additional polysulfidic linkages between the filler and polymer.

The SMLHCB compound can have a widened aggregate size distribution with a higher percentage of larger aggregates than a standard ASTM grade carbon black that is not low hysteresis.

In embodiments, the carbon black can be pretreated by oxidation prior to surface treatment with surface treatment chemical compounds. Such an oxidative process can be performed to increase a number of acidic groups on the surface of carbon black available to react with an amine group of the surface treatment chemical compound. In embodiments, the pretreatment by oxidation of the carbon black may be performed by methods such as, but not limited to, ozone treatment, heat treatment, plasma treatment, nitrogen oxides treatment, gaseous or aqueous hydrogen peroxide treatment, liquid nitric acid treatment, or a combination thereof.

The surface of the low hysteresis carbon black can thus, in embodiments, be oxidized prior to surface modification of the low hysteresis carbon black filler to produce the SMLHCB compound. For example, the surface can be oxidized by ozone treatment, heat treatment, plasma treatment, gaseous or aqueous hydrogen peroxide treatment, nitrogen oxides treatment, liquid nitric acid treatment, or a combination thereof.

In embodiments, an aggregate size of the low hysteresis carbon black filler can be in a range of from about 0.005 to about 1.0 micrometers ($\mu$m), from about 0.01 to about 0.8 $\mu$m, or from about 0.02 to about 0.6 $\mu$m. The SMLHCB can have a surface area in a range of from about 10 to about 250 $m^2/g$, from about 20 to about 200 $m^2/g$, or from about 30 to about 150 $m^2/g$.

Method of Producing SMLHCB

Also disclosed herein is a method of producing a surface modified low hysteresis carbon black (SMLHCB). In embodiments, the method comprises: treating a surface of a low hysteresis carbon black with from about 0.1 to about 50 wt %, from about 0.1 to about 30 wt %, from about 1 to about 16 wt %, or from about 3 to about 20 wt % of a surface modifier (as described above) to form the SMLHCB. In embodiments, the surface modifier comprises at least one amine group. In embodiments, treating the surface can comprise treatment via an acid-base process. As noted above, an aggregate size of the low hysteresis carbon black that is treated can be in a range of from about 0.005 to about 1.0 micrometers ($\mu$all), from about 0.01 to about 0.8 $\mu$m, or from about 0.02 to about 0.6 $\mu$m. In embodiments, the SMLHCB can have a surface area (e.g., a BET surface area) in a range of from about 10 to about 250 $m^2/g$, from about 20 to about 200 $m^2/g$, or from about 30 to about 150 $m^2/g$. A number of acidic groups on the surface can be increased before or during the treating of the surface. Accordingly, in embodiments, the method can further comprise using the low hysteresis carbon black (LHCB) directly without acid treatment or activating the surface and/or treating the surface with an acid to facilitate the treating of the surface with the surface modifier. The method can comprise utilizing the surface modifier directly without solubilizing same in basic solution or can include increasing a solubility of the surface modifier in liquid medium (e.g., water) by pre-treating the surface modifier with an inorganic and/or organic base (e.g., in pure form, in modified form, and/or in a solvent).

Method of Enhancing Crosslinking of SMLHCB

Also provided herein is a method for enhanced crosslinking of a surface modified low hysteresis carbon black (SMLHCB) into a polymer to create a rubber compound. In embodiments, the method can comprise: mixing the SMLHCB with the polymer at a temperature and a pressure (e.g., a temperature of about 165, 120, or 100° C., a pressure of about 80, 70 or 60 psi); reacting the SMLHCB with unsaturated bonds of said polymer with thiol group(s), and/or with disulfide and/or polysulfide linkage(s) on the surface of the SMLHCB; and curing to form the rubber compound. Curing can comprise heating the rubber compound (e.g., at 145° C.) under pressure (e.g., about 35,000 psi pressure, for example, using a laboratory press) for a specified time period, for example as determined by rheometer (e.g., Moving Die Rheometer: MDR)), wherein the SMLHCB is a SMLHCB as described hereinabove.

Features and Potential Advantages

The rubber compound produced as described hereinabove can comprise a reduced filler-filler networking, an increased amount of polymer-filler interactions, or both the reduced filler-filler networking and the increased amount of polymer-filler interactions, relative to an otherwise same rubber compound produced with a standard ASTM grade carbon black (e.g., that is not low hysteresis).

The rubber compound as produced and described herein can simultaneously exhibit improved rolling resistance, wet traction, and wear resistance relative to an otherwise same rubber compound produced with a standard ASTM grade carbon black (e.g., that is not low hysteresis and/or surface modified).

In embodiments the surface of carbon black (CB) can be modified as described hereinabove to: (a) improve carbon black-polymer (CB-P) interactions and/or to: (b) eliminate the need for utilization of a coupling agent in tread compounds. In embodiments the surface treated carbon blacks produced and disclosed as described herein can be utilized to prepare a tread compound, the final product properties of which are comparable to those of conventional tread compounds comprising the silica compound utilized as an industrial standard.

EXAMPLES

Example 1: Preparation of Surface Treated Carbon Black

In embodiments, as disclosed herein, and in order to improve compound properties, a carbon black surface can be coated with amino acid polysulfides utilizing a coat-mix procedure (Luhleich, et al. Carbon, Vol. 35, pp. 95-102, 1997), based on either a solvent or acid-base process.

As a non-limiting example, the process described herein can utilize cystine (Formula 1):

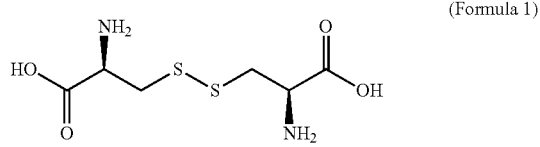 [SMILES: N[C@@H](CSSC[C@H](N)C(=O)O)C(=O)O]

(Formula 1)

The water solubility of cystine is low, and about 0.1 g/L. Conversion of cystine to the anionic form (sodium salt) can be attained in basic media (pH>8), where the acid groups —COOH become —COO$^-$. Very high water solubility can be achieved, allowing equilibrium coverage of the available carbon black surface in minimal time with lower volumes of water.

The reaction of cystine with base (i.e. NaOH) to create the soluble anionic form is stoichiometric, so a known amount of base can be added. To neutralize the cystine salt on the carbon black surface, the carbon black can first be acidified with the equivalent amount of acid (such as but not limited to hydrochloric acid (HCl)) in deionized water. The coating can be performed, as in this Example 1, by the slow addition of basic cystine solution to acidified carbon black suspension with constant stirring, while monitoring the pH of the batch.

Upon completion of cystine addition, the carbon black (CB) settled in a uniform layer and the NaCl/water (pH~7.5) supernatant layer was decanted. The carbon can then be washed and dried. For example, in this Example 1, the carbon was washed, e.g., 3 to 4 times, with deionized water, to remove traces of NaCl. The wet carbon/cystine slurry was then air dried, followed by oven drying for 2 hours at 140° C.

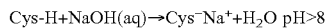

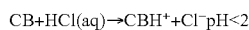

Example 2: Characterization of Carbon Black

Microscopic images of surface treated carbon black provide an idea of uniform coating. ASTM grade N234 carbon black was used as standard carbon black in a model tread compound. For this microscopic characterization study of Example 2, carbon black was treated with various quantities of cystine. When sufficient surface functional groups are present in the carbon black to bind with cystine, and the cystine content exceeds the surface area capacity for molecular coverage, white colored cystine crystal islands can be seen by microscope. FIG. 1 shows optical microscope images of untreated N234 in (a), treated N234 with 4 weight percent (wt %) cystine (ST4-N234) in (b) and treated N234 with 8 wt % cystine (ST8-N234) in (c). The plots of FIG. 1 suggest that 4 wt % of cystine can be uniformly coated, but 8 wt % of cystine resulted in some excess which was physiosorbed on the surface on N234, creating small cystine crystal islands. FIG. 1, panel (c) shows these white cystine crystals.

Figure 2:
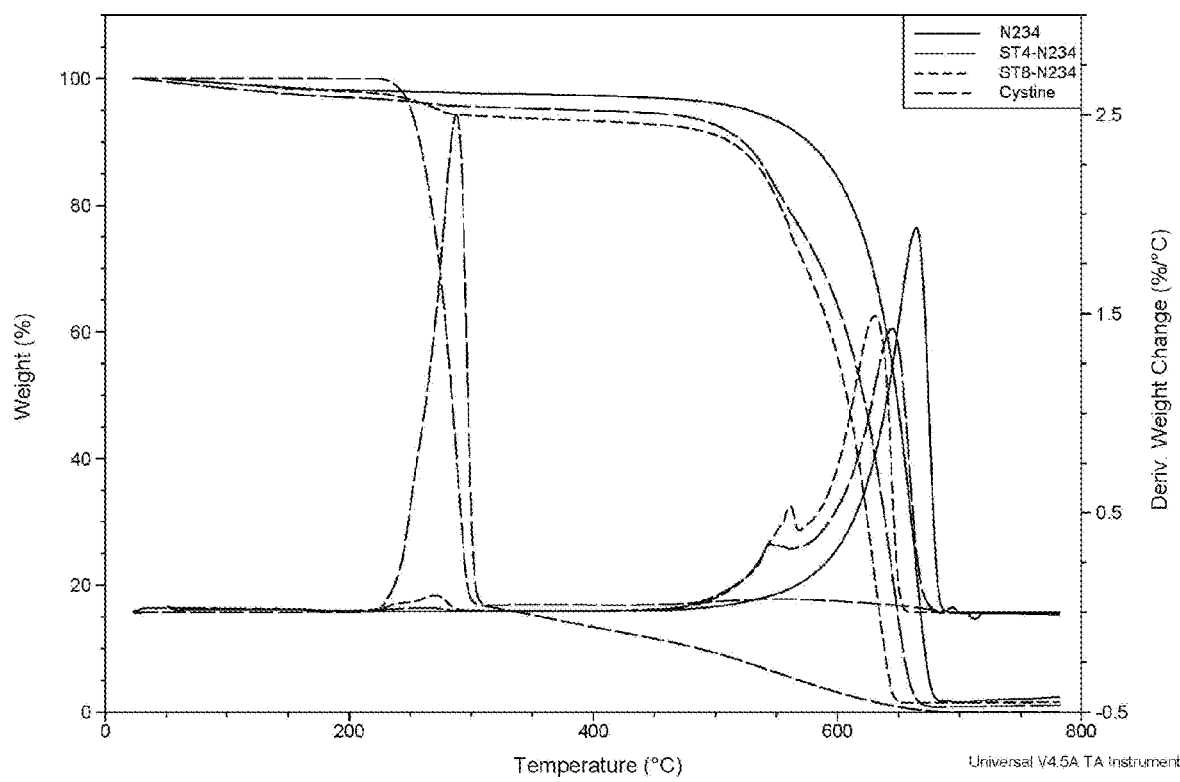
FIG. 2 depicts a TGA profile of cystine-treated, and untreated N234 as disclosed according to embodiments of this disclosure.

Thermal gravimetric analysis (TGA) suggested that attachment of cystine beyond physisorption had occurred. The TGA profile of pure cystine shows mass loss at approximately 250° C.; carbon black mass loss associated with carbon black burn-off appears at approximately 600° C., as seen in FIG. 2, which depicts a TGA profile of cystine-treated, and untreated N234. The TGA profile of untreated N234 does not show any mass loss at 250° C. The mass loss for ST4-N234 at this temperature is small, suggesting that the majority of the cystine has been chemisorbed. Compared to ST4-N234, ST8-N234 showed a larger mass loss at 250° C., which suggests more physisorption of cystine.

The strong acidic groups on the carbon black surface are key functional groups for chemisorption of surface treatment chemical compound via reaction with amine groups. The number of carboxylic acidic groups on the carbon black samples can be determined by treating the carbon black with sodium bicarbonate followed by back titration procedure (see Example 4 and Table 2 hereinbelow; see also, for example: Boehm Titration Revisited (Part I): Practical Aspects for Achieving a High Precision in Quantifying Oxygen-Containing Surface Groups on Carbon Materials, Jan Schönherr, Johannes R. Buchheim, Peter Scholz, and Philipp Adelhelm, C, 4, 21, 2018).

In this Example, during the surface treating process, the carbon black was acidified before reacting with the surface treatment chemical compound. This acidification caused the hydrolysis of lactonic groups on the carbon black surface, thus increasing the number of carboxylic acid groups. The anhydride groups present on the carbon black surface can also hydrolyze in aqueous medium, yielding carboxylic acid groups. Therefore, pre-modification/activation, as described hereinabove, of the surface can be performed before the reaction with the surface treatment compound(s). The data of Table 2, discussed hereinbelow, further confirmed the modification of the surface with the acidification step. The number of lactonic groups was determined by treating the carbon black with sodium carbonate followed by back titration procedure.

Surface treating changes the basic properties of carbon black (surface area and structure). Table 1 compares these properties for untreated and treated N234 and LH11. Surface treatment decreases surface area and structure and makes the carbon black more dense,

TABLE 1

Analytical Properties of Treated and Untreated Carbon Black

| Property | N234 | ST4-N234 | LH11 | ST4-LH11 |
|---|---|---|---|---|
| NSA, m$^2$/g | 119.7 | 114.3 | 118.0 | 113.4 |
| STSA, m$^2$/g | 110.9 | 110.0 | 110.5 | 108.3 |
| OAN, mL/100 g | 128.0 | 126.9 | 136.2 | 131.1 |
| COAN, mL/100 g | 101.5 | 100.4 | 108.7 | 106.8 |
| Density, lb/ft$^3$ | 20.4 | 20.7 | 19.4 | 19.8 |

NSA: nitrogen surface area;
STSA: statistical thickness surface area;
OAN: oil absorption number;
COAN: oil absorption number of compressed carbon black.

The number of carboxylic acidic groups on the carbon black samples was determined by treating the carbon black with sodium bicarbonate followed by back titration procedure, and the results are tabulated in Table 2.

TABLE 2

Number of Carboxylic and Lactonic Groups Present in HCl Treated and Untreated Carbon Black

| Sample | Carboxylic Acid Groups (μmol/g) | Lactonic Groups (μmol/g) |
|---|---|---|
| N234 | 7.69 | 52.62 |
| HCl treated N234 | 9.97 | 10.74 |
| LH11 | 5.08 | 68.46 |
| HCl treated LH11 | 9.30 | 12.08 |

Example 3: Rubber Compounding

As disclosed hereinabove, three major properties (the magic triangle properties) for tire performance are rolling resistance, wet traction, and wear resistance. In a laboratory set-up, these properties generally correlate with tan δ values at 70 and 0° C. and DIN abrasion respectively. High tan δ at 0° C., low tan δ at 70° C., and low DIN abrasion are generally desirable.

To study the effects of the carbon black surface treatment of this disclosure on rubber compound properties, a compound recipe from U.S. Pat. No. 5,227,425 was utilized as a model compound. Table 3 lists the ingredients utilized in each compound.

TABLE 3

Mixing Recipes

| Ingredients | A (N234) | B (LH11) | C (ST4-N234) | D (ST4-LH11) | E (Silica) |
|---|---|---|---|---|---|
| SSBR[1]/BR[2] | 75/25 | 75/25 | 75/25 | 75/25 | 75/25 |
| N234 | 72 | 0 | 0 | 0 | 0 |
| LH11 | 0 | 72 | 0 | 0 | 0 |
| ST4-N234 | 0 | 0 | 72 | 0 | 0 |
| ST4-LH11 | 0 | 0 | 0 | 72 | 0 |
| Silica-Particulate | 0 | 0 | 0 | 0 | 80 |
| X50S | 0 | 0 | 0 | 0 | 12.5 |
| Aromatic Oil (SUNDEX ® 8125) | 32.5 | 32.5 | 32.5 | 32.5 | 32.5 |
| ZnO | 2.5 | 2.5 | 2.5 | 2.5 | 2.5 |
| Stearic Acid | 1 | 1 | 1 | 1 | 1 |
| Paraffin Wax (BOWAX ™ 615) | 1.5 | 1.5 | 1.5 | 1.5 | 1.5 |
| Antioxidant (SANTOFLEX ™ 13) | 2 | 2 | 2 | 2 | 2 |
| Sulfur | 2 | 2 | 2 | 2 | 1.4 |
| SANTOCURE ® NS (TBBS) | 1.5 | 1.5 | 1.5 | 1.5 | 0 |
| CBS-Sulfenamid Accelerator | 0 | 0 | 0 | 0 | 1.7 |
| DPG-Diphenylguanidine Accelerator | 0 | 0 | 0 | 0 | 2.0 |

[1]Solution Polymerization Styrene-Butadiene Rubber
[2]PolyButadiene

To achieve the best dispersion, a 3-pass mixing process was used to maximize the compound M300/M100 modulus ratio (force ratio at 300% elongation to 100% elongation) which is an indication of proper dispersion.

Example 4: Results and Discussion

Compound A was prepared using standard ASTM grade N234 carbon black. Compound B was comparable to compound A, except that low hysteresis carbon black (LH11) was used in the compound. Compounds C and D are corresponding compounds to A and B, where surface treated carbon blacks were utilized in the compounds. Compound E was a model tread compound with silica as the filler instead of carbon black.

Figure 3:
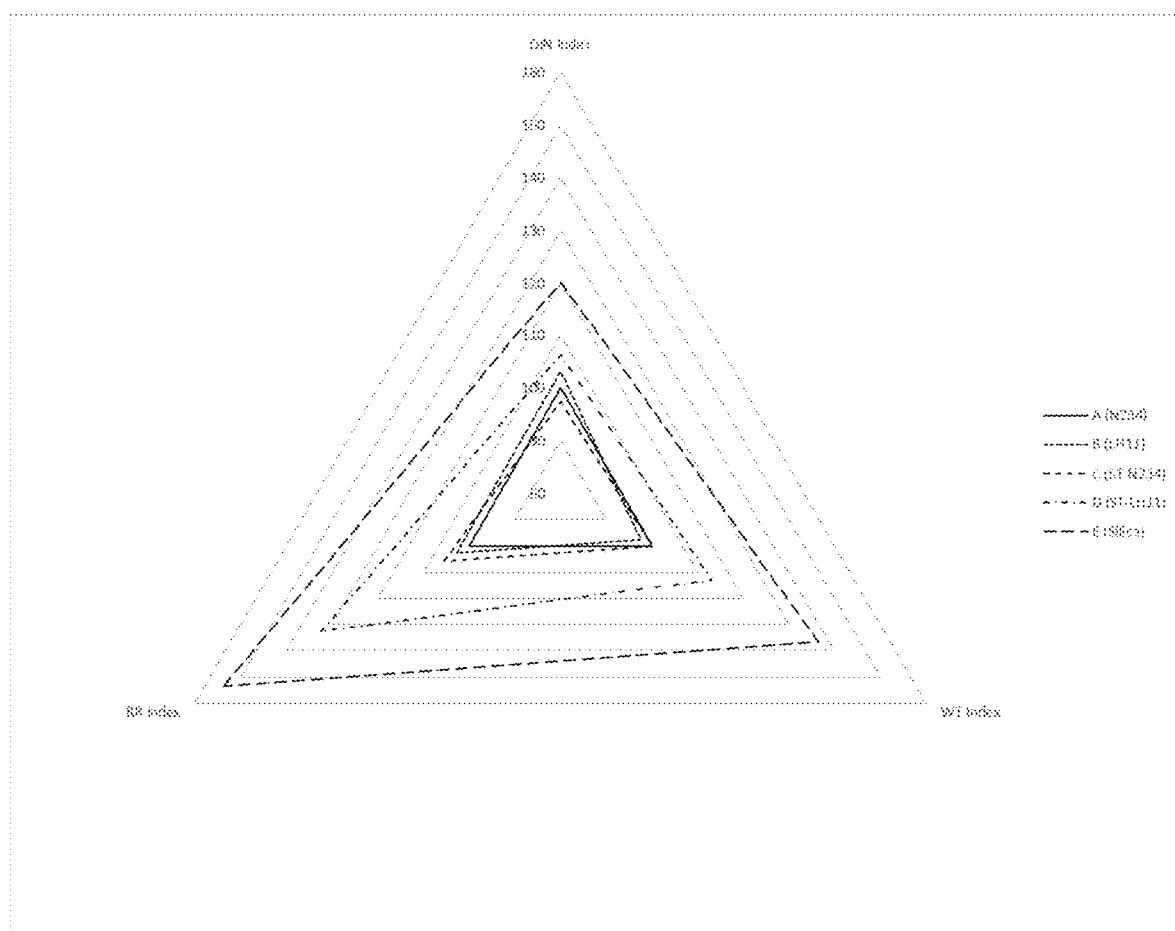
FIG. 3 depicts a "magic triangle" comprising indexed rolling resistance (RR), wet traction (WT), and DIN abrasion (DIN) values for embodiments of compounds according to this disclosure.

To evaluate tire tread compound performance properties, dynamic mechanical properties of compounds in −20 to 80° C. temperature range, along with DIN abrasion of compounds, were tested. Table 4 shows the indexed values for these properties; the higher the index, the better the property. FIG. 3 depicts the "magic triangle" comprising indexed rolling resistance (RR), wet traction (WT), and DIN abrasion (DIN) values for embodiments of compounds A-E of Examples 3-4.

TABLE 4

Indexed Tire Performance Properties

| Property | A (N234) | B (LH11) | C (ST4-N234) | D (ST4-LH11) | E (Silica) |
|---|---|---|---|---|---|
| M300/M100 | 4.8 | 4.8 | 4.4 | 4.3 | 5.0 |
| DIN Abrasion Resistance Index | 100 | 103 | 97 | 106 | 120 |
| Wet Traction (tan δ @0° C.) Index | 100 | 98 | 100 | 113 | 137 |
| Rolling Resistance (tan δ @70° C.) | 100 | 103 | 106 | 132 | 154 |

Figure 4:
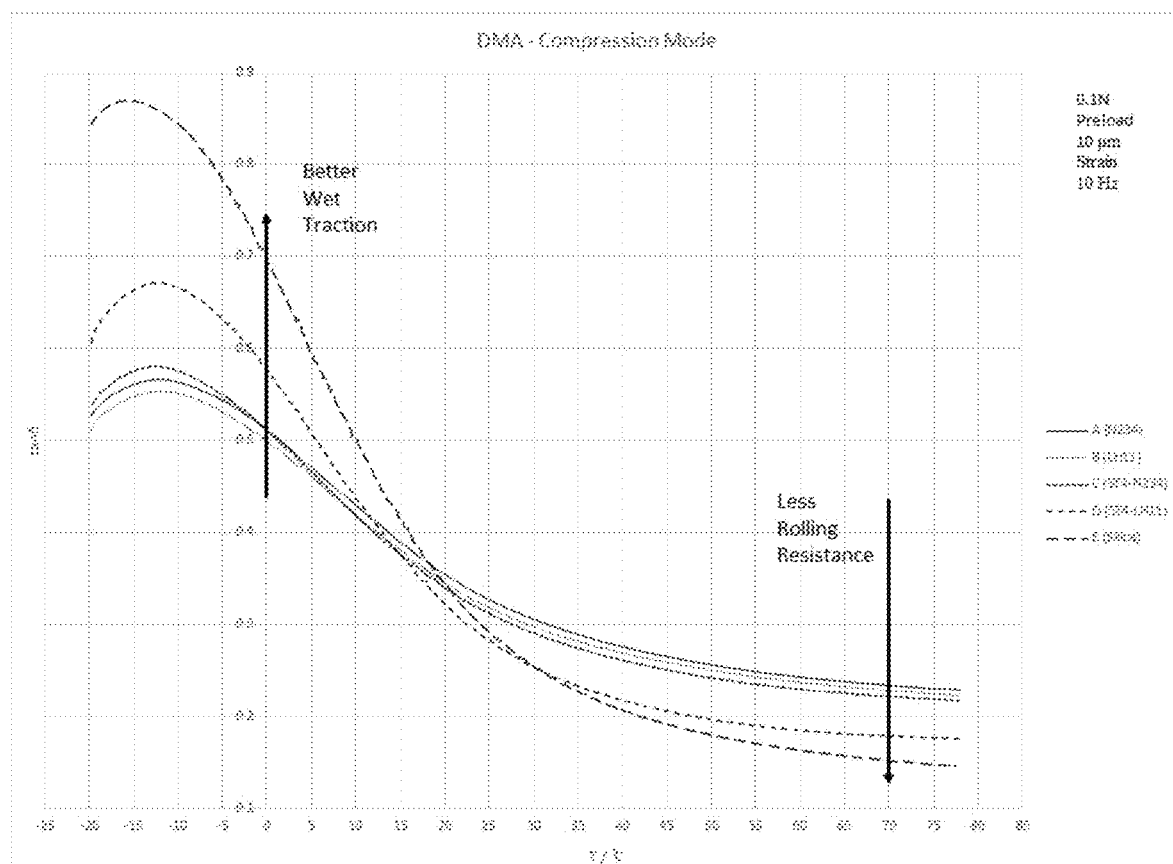
FIG. 4 depicts a hysteresis plot of embodiments of compounds according to this disclosure.

FIG. 4, which depicts hysteresis plots of compounds according to this disclosure, shows that the hysteresis plot of the compound comprising LH11 (Compound B) has shifted down compared to that of the compound comprising standard N234 carbon black (Compound A), confirming that LH11 is a low hysteresis carbon black. This means that the LH11 compound (Compound B) compared to N234 compound (Compound A) exhibits better rolling resistance and worse wet traction.

When the surface of standard N234 (Compound A) was modified chemically by cystine (ST4-N234 (Compound C)), rolling resistance was improved by 6% compared to standard N234 compound (Compound A). Improvement in rolling resistance by ST4-N234 compound (Compound C) and silica (Compound E) were 6% and 54% respectively and, hence, improvement by ST4-N234 compound (Compound C) was about 11% of the improvement by silica (Compound E). This treatment did not change the wet traction, however, there was a 3% negative effect in DIN abrasion for a ST4-N234 compound (Compound C) while a silica compound (Compound E) had 37% improvement in wet traction and 20% improvement in DIN abrasion.

When the surface of a low hysteresis carbon black (LH11) was modified chemically by cystine (ST4-LH11 (Compound D)), rolling resistance was improved by 32%. This was about a 60% improvement in rolling resistance as compared to when silica was used as filler (Compound E). In addition, a ST4-LH11 compound (Compound D) had 13% improvement in wet traction and 6% improvement in DIN abrasion. These improvements were about 35% and 30% of the improvements in wet traction and DIN abrasion respectively when silica was used as filler (Compound E).

In direct comparison, the surface treatment of low hysteresis carbon black as disclosed herein significantly improves rolling resistance, wet traction, and DIN abrasion of rubber compound, such that improvement of all three properties in the "magic triangle" are comparable to silica compounds, but without the negative properties associated therewith.

Additional Disclosure

The following are non-limiting, specific embodiments in accordance with the present disclosure:

A first embodiment comprises: a surface modified low hysteresis carbon black (SMLHCB) compound to simultaneously improve rolling resistance, wet traction, and wear resistance, the SMLHCB compound comprising: a low hysteresis carbon black having a surface that has been modified to have a surface modifier attached thereto, wherein the surface modifier comprises at least one amine group and at least one thiol group or di- or polysulfidic linkage.

In a second embodiment, a rubber compound comprises the SMLHCB compound of the first embodiment and a natural and/or synthetic polymer and/or polymer blend.

A third embodiment can include the rubber compound of the second embodiment, comprising a solution styrene butadiene rubber (SBR) (SSBR)-Polybutadiene (BR) blend.

A fourth embodiment can include the rubber compound of the third embodiment, comprising a weight ratio of SSBR:BR of about 100:0, 75:25, or 0:100, or in a range of from about 100:0 to about 0:100, from about 90:10 to about 10:90, or from about 80:20 to about 20:80.

A fifth embodiment can include the SMLHCB compound of the first embodiment, wherein the surface modifier comprises an amino acid.

A sixth embodiment can include the SMLHCB compound of the fifth embodiment, wherein the amino acid comprises a naturally occurring amino acid; a modified natural amino acid; a synthetic amino acid; a dimer thereof; a polymer thereof; a salt thereof; or a combination thereof.

A seventh embodiment can include the SMLHCB compound of any of the fifth and sixth embodiments, wherein the amino acid comprises cysteine, cystine, homocysteine, homocystine, methionine, or a combination thereof.

An eighth embodiment can include the SMLHCB compound of any one of the first and fifth to seventh embodiments, wherein the surface modifier comprises an amino acid having at least one thiol group, and/or di- and/or polysulfidic linkage, or an organic and/or inorganic compound containing at least one amine group, and at least one thiol group, and/or di- and/or polysulfidic linkage.

A ninth embodiment can include the SMLHCB compound of any of the prior embodiments, wherein the surface modifier is chemically linked to the surface via single or multiple bonds.

A tenth embodiment can include the SMLHCB compound of any of the prior embodiments, wherein the surface modifier is chemically linked to the surface by an amide or other bond formation, chemisorption, and/or physisorption.

An eleventh embodiment can include the SMLHCB compound of any of the prior embodiments, wherein the surface modifier is linked to the surface by at least one of: van der Waals interactions with a porous three-dimensional graphite lattice of the low hysteresis carbon black, covalent and/or ionic or other non-valent interactions with active surface moieties of the surface.

A twelfth embodiment can include the SMLHCB compound of any of the prior embodiments, wherein said active surface moieties comprise oxygen, nitrogen, and/or sulfur on the surface.

A thirteenth embodiment can include the SMLHCB compound of any of the prior embodiments, wherein the surface modifier comprises from about 0.1 to about 50 wt %, from about 0.1 to about 30 wt %, from about 1.0 to about 16 wt %, or from about 3 to about 20 wt % of the carbon black.

A fourteenth embodiment can include the SMLHCB compound of any of the prior embodiments, wherein said SMLHCB compound has a widened aggregate size distribution with higher percentage of larger aggregates than a standard ASTM grade carbon black that is not low hysteresis.

A fifteenth embodiment can include the SMLHCB compound of any of the prior embodiments, wherein said surface was oxidized prior to surface modification of the low hysteresis carbon black filler to produce the SMLHCB compound.

A sixteenth embodiment can include the SMLHCB compound of any of the prior embodiments, wherein the surface was oxidized by ozone treatment, heat treatment, plasma treatment, gaseous or aqueous hydrogen peroxide treatment, nitrogen oxides treatment, liquid nitric acid treatment, or a combination thereof.

A seventeenth embodiment can include the SMLHCB compound of any of the prior embodiments, wherein an aggregate size of the low hysteresis carbon black filler is in a range of from about 0.005 to about 1.0 micrometers ($\mu m$), from about 0.01 to about 0.8 $\mu m$, or from about 0.02 to about 0.6 $\mu m$.

An eighteenth embodiment can include the SMLHCB compound of any of the prior embodiments, wherein the SMLHCB has a surface area in a range of from about 10 to about 250 $m^2/g$, from about 20 to about 200 $m^2/g$, or from about 30 to about 150 $m^2/g$.

In a nineteenth embodiment, a method of producing a surface modified low hysteresis carbon black (SMLHCB) comprises: treating a surface of a low hysteresis carbon black with from about 0.1 to about 50 wt %, from about 0.1 to about 30 wt %, from about 1 to about 16 wt %, or from about 3 to about 20 wt % of the surface modifier, wherein the surface modifier comprises at least one amine group, to form the SMLHCB.

A twentieth embodiment can include the method of the nineteenth embodiment, wherein treating comprises treatment via an acid-base process.

A twenty first embodiment can include the method of the nineteenth or twentieth embodiment, wherein an aggregate size of the low hysteresis carbon black is in a range of from about 0.005 to about 1.0 micrometers (µm), from about 0.01 to about 0.8 µm, or from about 0.02 to about 0.6 µm.

A twenty second embodiment can include the method of any one of the nineteenth to twenty first embodiments, wherein the SMLHCB has a surface area (e.g., a BET surface area) in a range of from about 10 to about 250 $m^2/g$, from about 20 to about 200 $m^2/g$, or from about 30 to about 150 $m^2/g$.

A twenty third embodiment can include the method of any one of the nineteenth to twenty second embodiments, wherein a number of acidic groups on the surface is increased before or during the treating of the surface.

A twenty fourth embodiment can include the method of any one of the nineteenth to twenty third embodiments, further comprising the using of LHCB directly without acid treatment or activating the surface and/or treating the surface with an acid to facilitate the treating of the surface with the surface modifier.

A twenty fifth embodiment can include the method of any one of the nineteenth to twenty fourth embodiments, further comprising the using of surface modifier directly without solubilizing in basic solution or increasing solubility of the surface modifier in liquid medium (e.g., water) by pretreating with an inorganic or organic base (e.g., in pure form, in modified form, and/or in a solvent).

In a twenty sixth embodiment, a method for enhanced crosslinking of a surface modified low hysteresis carbon black (SMLHCB) into a polymer to create a rubber compound comprises: mixing the SMLHCB with the polymer at a temperature and a pressure (e.g., a temperature of about 165, 120, or 100° C., a pressure of about 80, 70 or 60 psi); reacting the SMLHCB with unsaturated bonds of said polymer with thiol group(s), and/or disulfide and/or polysulfide linkage(s) on the surface of the SMLHCB; and curing to form the rubber compound (e.g., wherein curing comprises heating the rubber compound (e.g., at 145° C.) under pressure (e.g., about 35,000 psi pressure, for example, using a laboratory press) for a specified time period determined by rheometer (e.g., Moving Die Rheometer: MDR)), wherein the SMLHCB is a SMLHCB of any of the prior embodiments.

A twenty seventh embodiment can include the method of the twenty sixth embodiment, wherein the rubber compound comprises a reduced filler-filler networking, an increased polymer-filler interactions, or both reduced filler-filler networking and increased polymer-filler interactions, relative to an otherwise same rubber compound produced with a standard ASTM grade carbon black that is not low hysteresis.

A twenty eighth embodiment can include the method of the twenty sixth or twenty seventh embodiment, wherein said rubber compound simultaneously exhibits improved rolling resistance, wet traction, and wear resistance relative to an otherwise same rubber compound produced with a standard ASTM grade carbon black that is not low hysteresis.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A surface modified low hysteresis carbon black (SMLHCB) compound to simultaneously improve rolling resistance, wet traction, and wear resistance, the SMLHCB compound comprising:
a low hysteresis carbon black having a surface that has been modified to have a surface modifier attached thereto, wherein the surface modifier comprises at least one amine group and at least one thiol group and/or di- and/or polysulfidic linkage.

2. A rubber compound comprising the SMLHCB compound of claim 1 and a natural or synthetic polymer or polymer blend.

3. The rubber compound of claim 2, comprising a solution styrene butadiene rubber (SBR) (SSBR)-polybutadiene rubber (BR) blend.

4. The rubber compound of claim 3, comprising a weight ratio of SSBR:BR of about 100:0, or in a range of from about 100:0 to about 0:100.

5. The SMLHCB compound of claim 1, wherein the surface modifier comprises an amino acid.

6. The SMLHCB compound of claim 5, wherein the amino acid comprises a naturally occurring amino acid; a modified natural amino acid; a synthetic amino acid; a dimer thereof; a polymer thereof; a salt thereof; or a combination thereof.

7. The SMLHCB compound of claim 5, wherein the amino acid comprises cysteine, cystine, homocysteine, homocystine, methionine, or a combination thereof.

8. The SMLHCB compound of claim 1, wherein the surface modifier comprises an amino acid having at least one thiol group, and/or di- and/or polysulfidic linkage, or an organic and/or inorganic compound containing at least one amine group, and at least one thiol group and/or di- and/or polysulfidic linkage.

9. The SMLHCB compound of claim 1, wherein the surface modifier is chemically linked to the surface via single or multiple bonds.

10. The SMLHCB compound of claim 9, wherein the surface modifier is chemically linked to the surface by an amide or other bond formation, chemisorption, and/or physisorption.

11. The SMLHCB compound of claim 9, wherein the surface modifier is linked to the surface by at least one of: van der Waals interactions with a porous three-dimensional graphite lattice of the low hysteresis carbon black, covalent and/or ionic or other non-valent interactions with active surface moieties of the surface.

12. The SMLHCB compound of claim 11, wherein said active surface moieties comprise oxygen, nitrogen, and/or sulfur on the surface.

13. The SMLHCB compound of claim 1, wherein the surface modifier comprises from about 0.1 to about 50 wt % of the carbon black.

14. The SMLHCB compound of claim 1, wherein said SMLHCB compound has a widened aggregate size distribution with higher percentage of larger aggregates than a standard ASTM grade carbon black that is not low hysteresis.

15. The SMLHCB compound of claim 1, wherein said surface was oxidized prior to surface modification of the low hysteresis carbon black filler to produce the SMLHCB compound.

16. The SMLHCB compound of claim 15, wherein the surface was oxidized by ozone treatment, heat treatment, plasma treatment, gaseous or aqueous hydrogen peroxide treatment, nitrogen oxides treatment, liquid nitric acid treatment, or a combination thereof.

17. The SMLHCB compound of claim 1, wherein an aggregate size of the low hysteresis carbon black filler is in a range of from about 0.005 to about 1.0 micrometers ($\mu m$).

18. The SMLHCB compound of claim 1, wherein the SMLHCB has a surface area in a range of from about 10 to about 250 m2/g.

19. A method for enhanced crosslinking of a surface modified low hysteresis carbon black (SMLHCB) into a polymer to create a rubber compound, the method comprising:
   mixing the SMLHCB with the polymer at a temperature and a pressure, wherein the SMLHCB is a SMLHCB of claim 1.

20. The method of claim 19, wherein the rubber compound comprises a reduced filler-filler networking, an increased amount of polymer-filler interactions, or both the reduced filler-filler networking and the increased amount of polymer-filler interactions, relative to an otherwise same rubber compound produced with a standard ASTM grade carbon black that is not low hysteresis.

21. The method of claim 19, wherein said rubber compound simultaneously exhibits improved rolling resistance, wet traction, and wear resistance relative to an otherwise same rubber compound produced with a standard ASTM grade carbon black that is not low hysteresis.

* * * * *